Patented Oct. 26, 1937

2,097,416

UNITED STATES PATENT OFFICE 2,097,416

COAGULATION OF LATEX

Stephen B. Neiley, Winchester, Mass., assignor to Dewey and Almy Chemical Company, North Cambridge, Mass., a corporation of Massachusetts No Drawing. Application July 25, 1935,
Serial No. 33,076

14 Claims. (Cl. 18—50)

This invention relates to the coagulation of latex and to a process of forming rubber articles.

A broad object of my invention is to devise a process for coagulating latex at ordinary atmospheric temperatures and in ordinary atmospheres.

A further object of my invention is to devise a process of forming rubber articles from latex in which coagulation of the latex is inherent in one of the steps of the process.

There are many instances where it is desirable for coagulation of latex to occur, but the use of normal coagulants is precluded—or causes certain process difficulties. For example, in the casting of latex against gelatin moulds, acid coagulants cause dimensional changes, and heat activated coagulants are deleterious to the gelatin. Again, in the non-uniform impregnation of sheets, controlled penetration of the latex is quite impossible with conventional coagulation procedure. In the spraying of latex on objects to form coherent, non-adhesive, detachable films, many complications arise, since the coagulant and latex are separately handled, while in the dipping of forms, pollution of the latex by the coagulant causes serious loss.

More specific objects of this invention are: to cause the coagulation of latex to occur under conditions where the application of heat or the addition of active coagulants is precluded; to cause latex to coagulate in situ upon a form or within a mould; to control the depth of penetration of latex into a fibrous sheet to the end that such sheets may be impregnated in a non-uniform manner; and to provide commercially stable latex compounds capable of self-coagulation in response to certain conditions. These and other objects will become apparent as the specification proceeds.

I have discovered that certain substances, normally non-coagulative of latex and which may be mixed therewith to give commercially stable compounds at normal atmospheric temperatures are, none the less, active coagulants for latex if a protective or buffering substance is removed from the compound.

I have discovered that latex compounds may be made which are exceedingly sensitive to the loss of a stabilizing excess of a fugitive amine and that such compounds will coagulate rapidly after the amount of the amine therein has fallen to a critical value. With an excess of the amine present, however, the compounds are commercially stable at normal atmospheric temperatures.

To cause coagulation, the excess of the amine is removed by absorption, or by evaporation, and this may be brought about in a number of ways—as the following examples show:

A form is sprayed with the compound using a latex-type multiple jet spray gun requiring about 8 cubic feet per minute of free air at 35 lbs. pressure. This large volume of air is amply sufficient to volatilize off all the stabilizing amine from a commercially stable compound. By adjusting the flow of air, the latex may be made to hit the form as a liquid, at the stage of incipient coagulation, or as a spray of already coagulated particles. Whenever a strong, impervious article is desired—as in gloves, the stage of incipient coagulation is recommended, for a dense, continuous film is formed thereby which is thoroughly coagulated within a few seconds after the spray is shut off.

Uniformity of thickness of the film is more easily obtained by using white or reflective forms and by dyeing the latex—or compounding it with a pigment, then spraying the form until the color is uniform.

When articles are to be protected temporarily by a latex coat, a spray composed mainly of coagulated particles may be used. The coating formed therefrom may be slightly porous, but is usually thoroughly effective as a temporary protection.

As a second example of the utility of my invention I will describe its use in connection with the manufacture of surgical or dental sheets. The compound is run out onto an impervious belt, made from a printer's blanket or oil cloth, levelled to uniform thickness by means of a doctor blade and passed through a current of air, (ordinary electric fans blowing over the surface are sufficient). The coagulated sheet is now taken off continuously upon a felt or wire and passed through a tunnel drier where it is both dried and vulcanized simultaneously.

I have found my invention, also, particularly useful in the backing of upholstery fabrics such as suedes and velours and may control the penetration of the rubber into the fabric, or the amount built up around the roots of the pile to a precise degree.

The cloth, pile downwards, is passed under a spray of latex containing my coagulant—while the air fed with the latex is adjusted so that when the latex hits the cloth it will be upon the threshold of incipient coagulation. The absorptivity of the cloth completes the coagulation by pulling a small amount of the amine away from the rubber dispersion. Thereafter, the cloth is dried—and, if desired, the rubber therein may be vulcanized at the same time.

This particular process is also valuable when used in connection with fibrous webs or felts, for, by adjusting the threshold of incipient coagulation as described—the depth of penetration of the rubber into the web may be controlled. I am, thus, able to produce felts and webs having a non-uniform distribution of rubber therein.

The invention has also proved particularly useful in conjunction with the casting of latex upon absorptive matrices, for instance, in connection with a process disclosed by Theodore C. Browne, Patent No. 2,022,183, dated Nov. 26, 1935.

Essentially, the process comprised preparing a bichromated photographic image in a gelatin plate, and pouring latex thereover. The gelatin thereupon absorbs water from the latex and swells in the portions unaffected by light. The latex, in drying, assumes the form of the swelled gelatin and, when dried and vulcanized, is used as a printing plate.

In this process, ammonia has proved to be the preferable amine.

It was found that the gelatin absorbed from the latex, not only the water, but the stabilizing ammonia as well. Consequently, by incorporating one of my dormant coagulants with the latex, when a sufficient amount of stabilizing ammonia has entered the gelatin, the latex coagulates.

Not only is the time of manufacture of a usable printing plate cut down to a few minutes thereby, but a far more accurate control of the vertical dimensions of the printing plate is achieved.

Since gelatin imbibes water practically to an unlimited extent and swells, the correct swelled height of the gelatin for printability, is a transitory stage. By adjusting the percentage of excess ammonia to potential coagulant, the optimum, but fugitive condition of the gelatin may be caught and rendered permanent in the coagulated latex mass.

The potential coagulants used in the present invention are the same as the coagulants disclosed and claimed in my prior Patent No. 1,896,054, reissued as No. 19,426, but in my former invention activation of the coagulant is produced by raising the temperature of the compound to a critical value, and when this temperature is reached, the entire body of the compound coagulates at the same time.

The present invention does not depend upon heat activation, but depends upon the removal of the stabilizing excess of ammonia either by evaporation or by absorption at ordinary room temperatures. It has been found that a loss of 0.3% of stabilizing ammonia in a latex compound containing 50% rubber solids and 1.56% total weight of zinc chloride will result in coagulation at ordinary room temperatures. In contradistinction to the heat activatible process of my prior invention, which coagulates the whole mass at a critical temperature, the present invention involves coagulation of only such parts of the compound that have been freed of the stabilizing excess of ammonia.

In addition to ammonia, the primary, secondary, and tertiary methylamines and ethylamine are suitable for the purposes of my invention, the requirement being that the amine shall be fugitive or evaporated at, or below normal temperatures in the presence of water.

The following three examples have been found useful for spraying protective coatings upon articles of manufacture. In each example, the potential or "dormant" coagulant employed consists of 25 parts ammonium benzoate, 10 parts zinc oxide and 25 parts ammonia:

Example 1

| | Parts |
|---|---|
| Commercial ammonia preserved latex (39% rubber solids) | 1000 |
| Potential coagulant | 8 |

Example 2

| | Parts |
|---|---|
| Commercial ammonia preserved latex (39% rubber solids) | 1000 |
| Potential coagulant | 11 |

Example 3

| | Parts |
|---|---|
| Commercial concentrated latex (61.6% rubber solids) | 1000 |
| Potential coagulant | 11 |

In a test of the No. 1 compound given above, using a suction feed and cold air on a latex type spray gun feeding about 7 cubic feet of air per minute at 35 lbs. of pressure, it was found that the sprayed film thoroughly sets in four to five minutes, while in the same test on compound No. 2, the film set almost instantly.

In a spray test using a pressure feed on compound No. 2, the film set up in three to four minutes, and when a smaller nozzle was substituted, allowing less latex to be sprayed, the film set up in less than three minutes.

In a spray test of compound No. 3, using suction feed and cold air, the film sprayed on white buck leather set up in ten seconds and was firm enough to strip or peel from the leather in twenty seconds.

In spraying articles according to my present invention to produce temporary coatings for protection during manufacturing process, the quantity of air supplied to the spray gun may be properly adjusted so as to control or entirely prevent the penetration of the latex composition into the form being sprayed. In this way, the penetration may be controlled even when the form or material is absorbent so that the film may be easily stripped or removed from the article after it has served its purpose. In these spraying operations, hot air may be employed if desired for accelerating the evaporation of the ammonia.

The above examples are given as basic formulae. It will be understood that the latex may contain compounding ingredients such as sulphur, accelerators and fillers. The potential coagulant acts only upon the latex component and it is not necessary to change the proportions materially from those given in the above examples when compounded latex is used. I have used the word "latex" in a generic sense to include not only true *Hevea brasiliensis* latex but other natural latices and artificial dispersions.

Because of the lack of a recognized inclusive term, I have not used the word amine in its strict chemical sense as an alkyl substitution product of ammonia, but broadly. In the appended claims, I intend that the word amine shall include not only substitution products of ammonia, but ammonia itself.

What I claim is:

1. The process of coagulating latex which comprises incorporating in the latex a fugitive amine and a potential coagulant which is inactive in the presence of an excess of the amine, then removing the excess of amine at normal temperatures whereby the potential coagulant becomes active and coagulation of the latex is brought about.

2. The process of coagulating latex which comprises incorporating in the latex ammonia and a potential coagulant which is inactive in the presence of an excess of ammonia, removing the excess of the ammonia at normal temperatures whereby the potential coagulant becomes active and coagulation of the latex is brought about.

3. The process of coagulating latex which comprises incorporating in the latex a fugitive amine and a potential coagulant which is inactive in the presence of an excess of the amine, evaporating the excess of the amine and thereby causing the latex to coagulate.

4. The process of coagulating latex which comprises incorporating in the latex a potential coagulant and a stabilizing excess of a fugitive amine, atomizing the latex in a sufficient stream of air to remove the excess of the amine by evaporation, whereby the potential coagulant becomes active and coagulation of the latex is brought about.

5. The process of coagulating latex which comprises incorporating in the latex a potential coagulant and a stabilizing excess of a fugitive amine, reducing the amine in the mixture to a value whereat the latex is at the stage of insipient coagulation, applying the latex to an article to be coated, whereby the remaining excess of the amine is removed by absorption into the article and the potential coagulant becomes active to bring about coagulation of the latex.

6. The process of coagulating latex which comprises incorporating in the latex a potential coagulant and a stabilizing excess of a fugitive amine, reducing the amine in the mixture to a predetermined value, applying the latex to an amine absorptive substance, thereby removing all stabilizing excess of the amine from the latex and causing the potential coagulant to become active and to coagulate the latex.

7. The process of coagulating latex which comprises incorporating in the latex a potential coagulant and a stabilizing excess of ammonia, reducing the ammonia in the mixture to a predetermined value, applying the latex to an ammonia absorptive substance, thereby removing all stabilizing excess of ammonia from the latex and causing the potential coagulant to become active and to bring about coagulation of the latex.

8. The process of coagulating latex which comprises incorporating in the latex a potential coagulant and a stabilizing excess of an amine, applying the mixture to an amine absorptive form, absorbing the amine from the mixture and thereby causing the potential coagulant to become active and to coagulate the latex.

9. The process of coating articles with rubber which comprises incorporating in latex a potential coagulant and a stabilizing excess of an amine therefor, spraying the article with the latex mixture, causing the excess of the amine to evaporate during spraying whereby the potential coagulant becomes active and a coherent film of rubber is produced upon the surface of the article by the coagulation of said latex.

10. The process of impregnating porous articles with rubber to controlled depths below their surface which includes the steps of incorporating in latex a potential coagulant and a stabilizing excess of an amine therefor, spraying the porous article with the mixture and removing a certain proportion of the amine by evaporation in the spray, permitting the porous article to absorb the remaining excess of the amine and thereby coagulating the latex after the latex has penetrated the article to a predetermined depth.

11. The process of impregnating porous articles with rubber to controlled depths below their surface which includes the steps of incorporating in latex a potential coagulant and a stabilizing excess of ammonia therefor, spraying the porous article with the mixture and removing a certain proportion of the ammonia by evaporation in the spray, permitting the porous article to absorb the remaining excess of ammonia and thereby coagulating the latex after the latex has penetrated the article to a predetermined depth.

12. The process of impregnating bibulous webs with rubber to controlled depths below their surface which includes the steps of incorporating in latex a potential coagulant and a stabilizing excess of an amine therefor, spraying the bibulous webs with the mixture and removing a certain proportion of the amine by evaporation in the spray, permitting the bibulous webs to absorb the remaining excess of amine and thereby coagulating the latex after the latex has penetrated the web to a predetermined depth.

13. The process of forming shaped rubber masses on gelatin moulds which includes flooding the mould with liquid latex containing a potential coagulant and a stabilizing excess of ammonia, and allowing the latex to remain on the mould until the excess ammonia is absorbed by the gelatin.

14. The process of forming rubber articles which consists in forming a gelatin matrix for the article, flooding the matrix with liquid latex containing a potential coagulant and a stabilizing agent in sufficient quantity such that absorption of the stabilizing agent by the gelatin matrix causes coagulation of the latex.

STEPHEN B. NEILEY.